(12) United States Patent
Fisher et al.

(10) Patent No.: US 8,001,861 B2
(45) Date of Patent: Aug. 23, 2011

(54) HIGH FORCE ELECTRO-MECHANICAL ACTUATOR

(75) Inventors: Mark Richard Fisher, Cuyahoga Falls, OH (US); Ronald James Dishong, Wadsworth, OH (US); Dominic Matthew Numer, Orrville, OH (US); Robert Lewis Briant, Copley, OH (US)

(73) Assignee: Parker-Hannifin Corporation, Cleveland, OH (US)

(*) Notice: Subject to any disclaimer, the term of this patent is extended or adjusted under 35 U.S.C. 154(b) by 722 days.

(21) Appl. No.: 12/032,180

(22) Filed: Feb. 15, 2008

(65) Prior Publication Data
US 2009/0095098 A1 Apr. 16, 2009

Related U.S. Application Data

(60) Provisional application No. 60/978,872, filed on Oct. 10, 2007.

(51) Int. Cl.
| | |
|---|---|
| F16H 1/26 | (2006.01) |
| F16H 3/06 | (2006.01) |
| F16H 27/02 | (2006.01) |
| F16H 29/02 | (2006.01) |
| F16H 29/20 | (2006.01) |

(52) U.S. Cl. ...................... 74/89.36; 74/89.23
(58) Field of Classification Search ............. 74/89.23, 74/89.26, 89.3, 89.31, 89.32, 89.36, 89.45
See application file for complete search history.

(56) References Cited

U.S. PATENT DOCUMENTS

| | | | |
|---|---|---|---|
| 2,927,473 A | 3/1960 | Bentley | |
| 2,978,113 A | 4/1961 | Anderson et al. | |
| 4,821,596 A | 4/1989 | Eklund | |
| 4,912,994 A | 4/1990 | Roberts | |
| 5,295,407 A | 3/1994 | Hirose et al. | |
| 5,355,287 A | 10/1994 | Denley | |
| 5,511,439 A * | 4/1996 | Las Navas Garcia | 74/89.34 |
| 5,829,115 A | 11/1998 | Speller, Jr. et al. | |
| 6,357,100 B2 | 3/2002 | Speller, Jr. et al. | |
| 6,396,173 B1 | 5/2002 | Prampolini | |
| 6,494,005 B2 * | 12/2002 | Zimmerman | 52/296 |
| 6,543,121 B2 | 4/2003 | Speller, Jr. et al. | |
| 6,662,672 B2 | 12/2003 | Someya | |
| 7,159,482 B2 | 1/2007 | Nagai et al. | |
| 7,226,111 B2 | 6/2007 | Berklich, Jr. et al. | |
| 7,249,918 B1 | 7/2007 | Bowman | |
| 2005/0155444 A1 | 7/2005 | Otaki et al. | |
| 2005/0253469 A1 | 11/2005 | Hochhalter et al. | |
| 2005/0268736 A1 * | 12/2005 | Gaechter | 74/89.23 |
| 2006/0042166 A1 | 3/2006 | Berklich, Jr. et al. | |
| 2006/0156838 A1 * | 7/2006 | Las Navas Garcia | 74/89.23 |
| 2007/0137330 A1 * | 6/2007 | Hoth et al. | 74/89.23 |
| 2009/0165581 A1 * | 7/2009 | Koyagi et al. | 74/89.23 |
| 2009/0314111 A1 * | 12/2009 | Schunke | 74/89.32 |

FOREIGN PATENT DOCUMENTS
EP 0831250 A2 3/1998
* cited by examiner

*Primary Examiner* — Justin Krause
(74) *Attorney, Agent, or Firm* — Robert Clark

(57) ABSTRACT

An actuator is disclosed that utilizes a fixed screw attached at one end to an actuator housing. A rotatable tube concentric with the fixed screw rotationally drives a nut having threads engaging the threaded shaft, such that the nut moves axially relative to the tube, upon rotation of the tube. The actuator is axially coupled to the nut by thrust bearings such that the actuator rod does not rotate with the driven member.

21 Claims, 11 Drawing Sheets

HIGH FORCE ELECTRO-MECHANICAL ACTUATOR

CROSS-REFERENCE TO RELATED CASES

This application claims the benefit of U.S. Provisional Application Ser. No. 60/978,872; filed Oct. 10, 2007, the disclosure of which is expressly incorporated herein by reference.

TECHNICAL FIELD

This invention relates to actuators, and more particularly, to an electric actuator utilizing a fixed screw and a rotating tube.

BACKGROUND

Actuator systems are known in the prior art and utilized for linearly moving and positioning a workpiece relative to a housing. Typical prior art electric actuators utilize a rotatable, externally threaded shaft, typically referred to as a screw, and a nut having internal threads matching the external threads of the screw. The nut is rotationally fixed and advances or retracts linearly along the screw in response to the rotation of the screw. The screw typically extends substantially from one end of the actuator to the other and is supported at each end. In this configuration, the middle portion of the screw will tend to sag, thereby creating an out-of-balance or eccentric condition when the screw is rotated. This out-of-balance condition is accentuated with a decrease in the diameter of the screw, an increase in the rotational speed of the screw or an increase in the length of the screw. Thus, for a given screw diameter, an unacceptable increase in the rotational speed or screw length, will cause the shaft to wobble or whip in jump rope fashion along the axis of the actuator. This not only places an upper limit on the acceptable linear speed and screw shaft length, but also leads to premature failure and wear of the screw shaft and nut and faulting of the rotary drive mechanism. Such vibrations and whipping action can also impair the accuracy of the positioning system.

Another problem encountered by these prior art actuators is that the loads encountered by the actuator rod are transferred ultimately through the rotary drive mechanism. The loads on the actuator rod are transferred through the nut to the screw shaft and then to the motor which rotationally drives the shaft. These loads adversely affect the motor life of the actuator.

Accordingly, there is a need in the art for a more robust actuator that is not limited by the use of a rotationally driven screw shaft.

SUMMARY OF THE INVENTION

At least one embodiment of the invention provides an actuator comprising: a housing; an externally threaded shaft fixably supported by the housing; a rotatable tube concentric with the threaded shaft; a driven member having threads engaging the threaded shaft, and the driven member rotationally coupled to the tube and axially moveable relative to the tube, upon rotation of the tube.

At least one embodiment of the invention provides an actuator comprising: a fixed screw attached at one end to an actuator housing; a rotatable tube concentric with the fixed screw; a nut having threads engaging the threaded shaft, the nut rotationally coupled to the tube and axially moveable relative to the tube, upon rotation of the tube; an actuator rod axially coupled to the nut, wherein the actuator rod does not rotate with the driven member.

At least one embodiment of the invention provides an actuator comprising: an electric motor having a rotor and a stator positioned within a motor housing; a stationary, externally threaded shaft fixably attached to the motor housing; a rotatable tube concentric with the externally threaded shaft, the tube rotationally coupled to the rotor and selectively driven by the electric motor; a nut having threads engaging the externally threaded shaft, the nut rotationally coupled to the tube and axially moveable relative to the tube, upon rotation of the tube; an actuator rod axially coupled to the nut, wherein the actuator rod does not rotate with the nut; a stationary tube positioned over the rotatable tube and concentric with the rotatable tube; and a plurality of support bearings positioned between the stationary tube and the rotatable tube.

At least one embodiment of the invention provides a method for extending and retracting a rod comprising the steps of: rotating a tube in a first rotational direction, wherein the tube is rotationally coupled to a nut, the nut threadably engaged to a stationary externally threaded shaft such that rotation of the nut causes axial movement of the nut in a first axial direction with respect to the tube wherein the rod is axially coupled to the nut such that the rod moves axially with the nut; and rotating the tube in a second rotational direction, wherein the rod moves is an opposite axial direction to the first axial direction.

DESCRIPTION OF DRAWINGS

Figure 1:
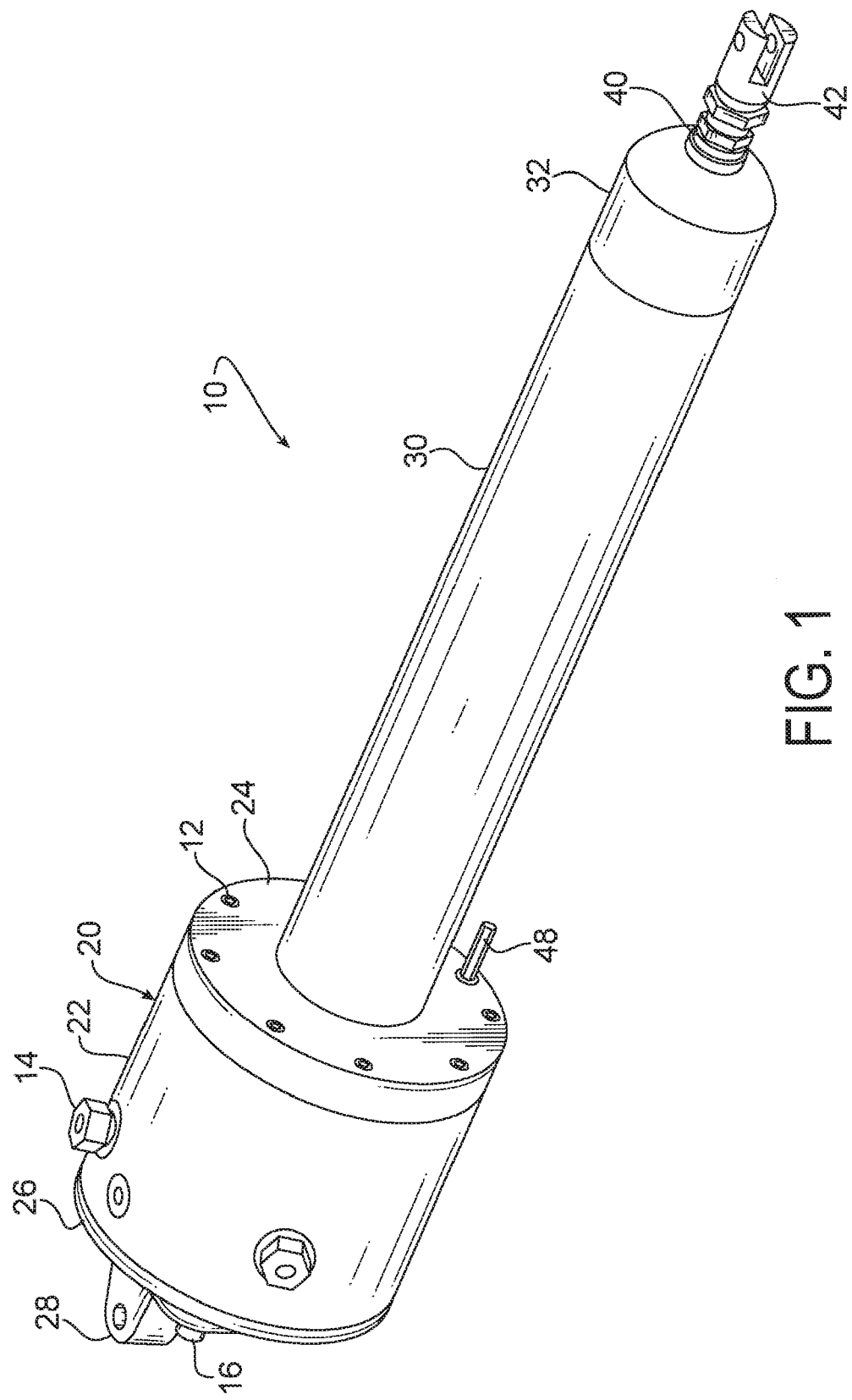
FIG. 1 is a perspective view of an embodiment of the high force electro-mechanical actuator of the present invention shown with the actuator rod retracted.
Figure 2:
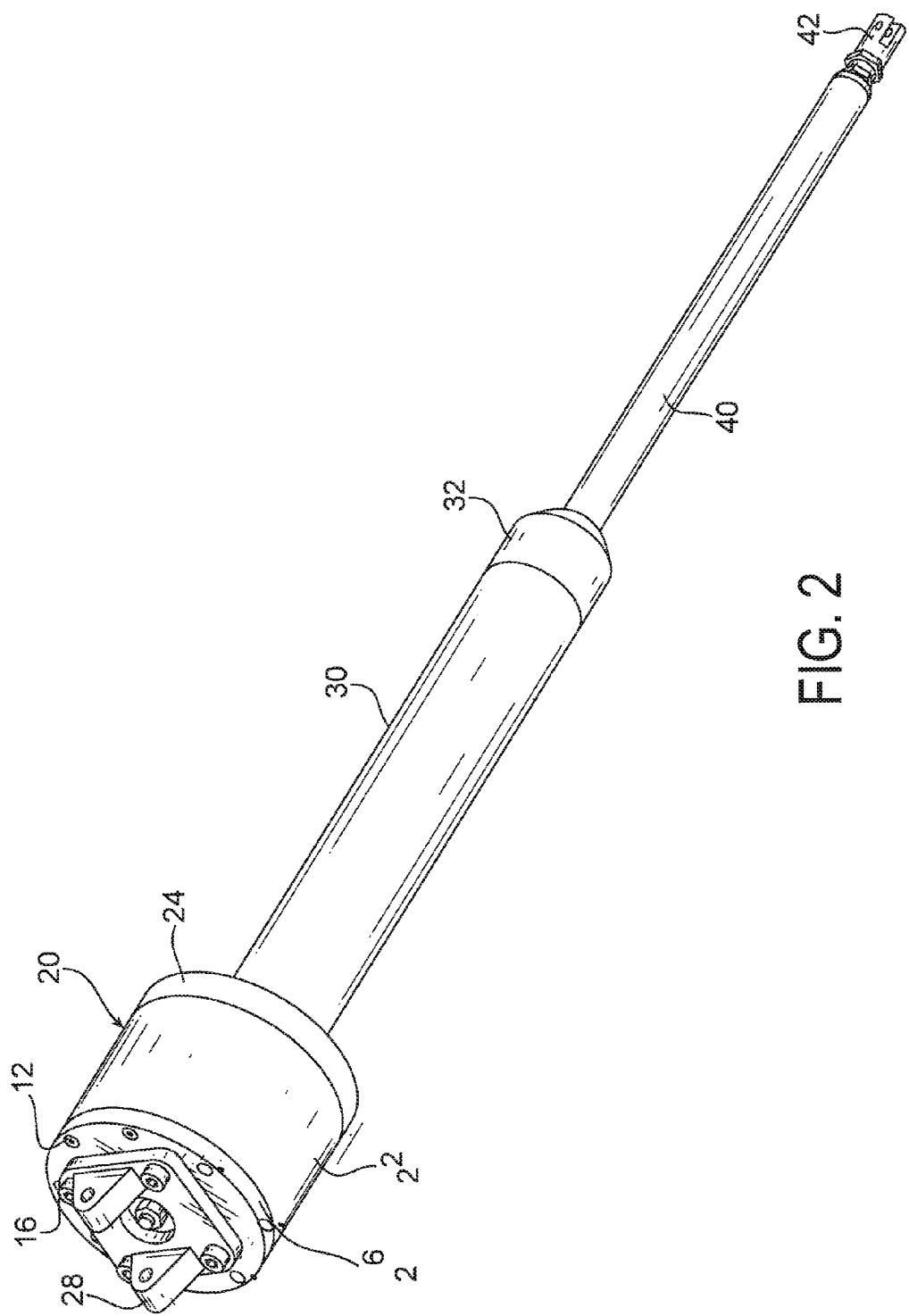
FIG. 2 is a perspective view of the high force electro-mechanical actuator of FIG. 1 shown with the actuator rod extended.

Referring to FIGS. 1-2, an external view of an embodiment of the electric actuator 10 is shown in a retracted position (FIG. 1) and an extended position (FIG. 2). The actuator 10 comprises a motor housing 20, a cylindrical cover 30 having an end cover 32 at one end thereof through which an actuator rod 40 protrudes. The end cover 32 may also include seals 92 and/or a low-friction support bushing 100 for the actuator rod 40. The actuator rod 40 is shown having a clevis 42 attached at a distal end thereof. The motor housing 20 includes a generally cylindrical housing cover 22 between a front plate 24 and an end plate 26, each plate secured to the cylindrical housing cover 22 by fasteners 12. Electrical connectors 14 extend radially outward from the cylindrical housing cover 22. An attachment means 28 such as a clevis is shown attached to the exterior surface of the end plate by fasteners 16. The motor housing 20 and cylindrical cover 30 house and protect the interior actuator components from contamination.

Figure 3:
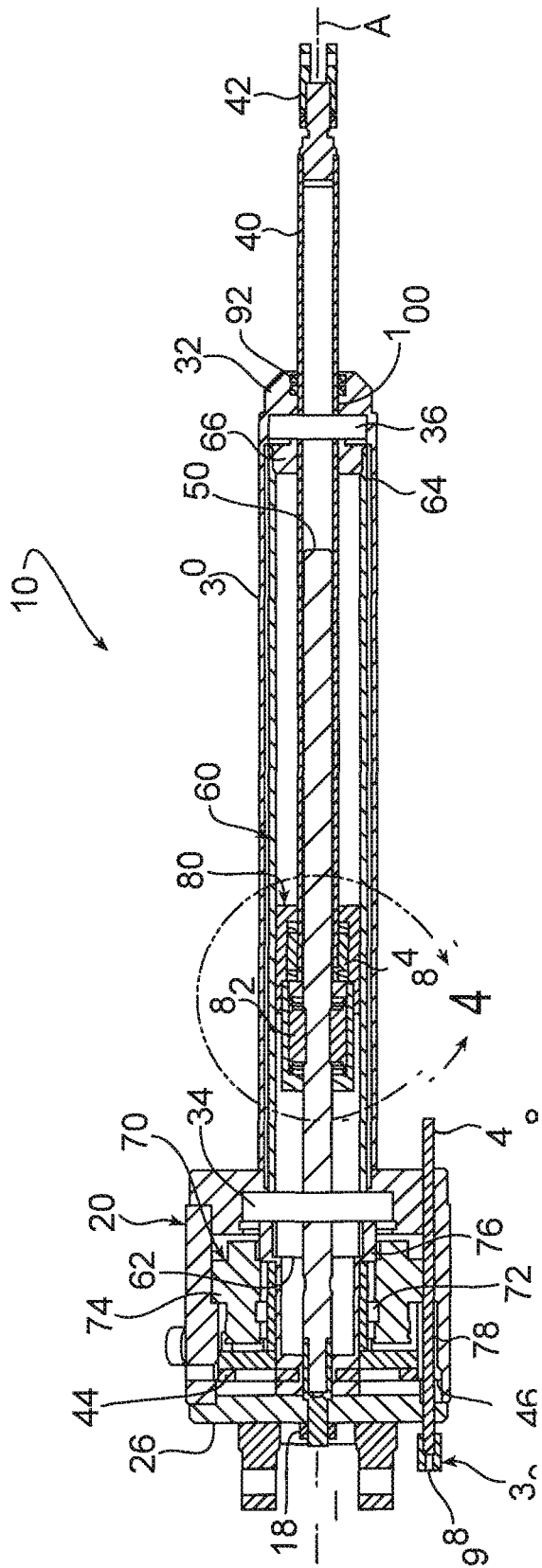
FIG. 3 is a cross-sectional view of the high force electro-mechanical actuator of FIG. 1 taken along the longitudinal axis of the actuator.
Figure 4:
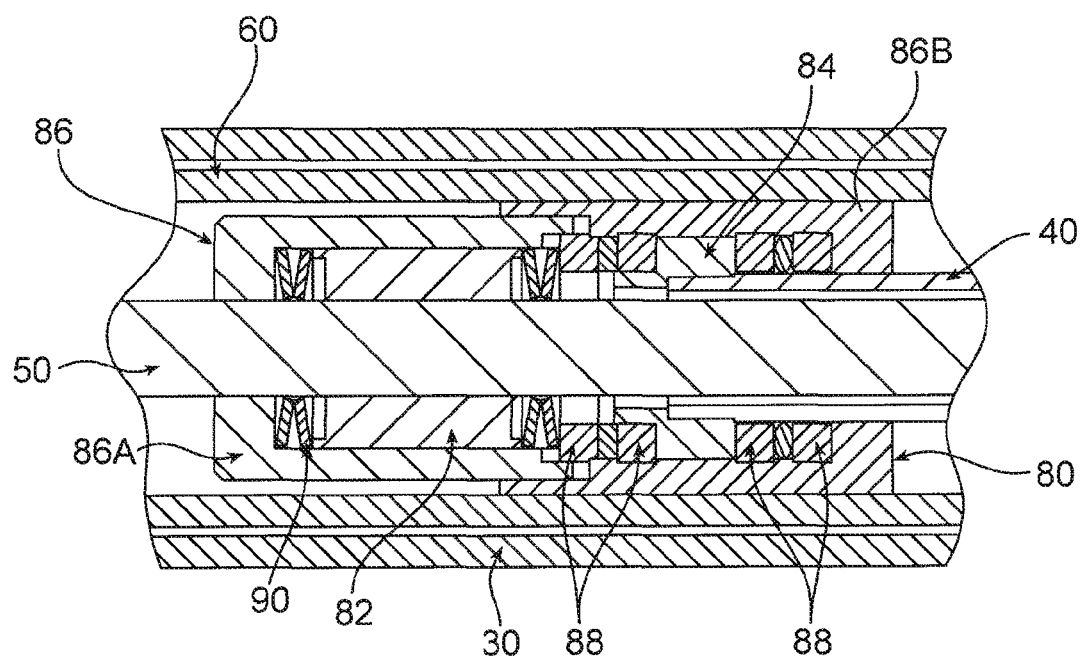
FIG. 4 is a detail, cross-sectional view of the nut assembly shown in FIG. 3.
Figure 5:
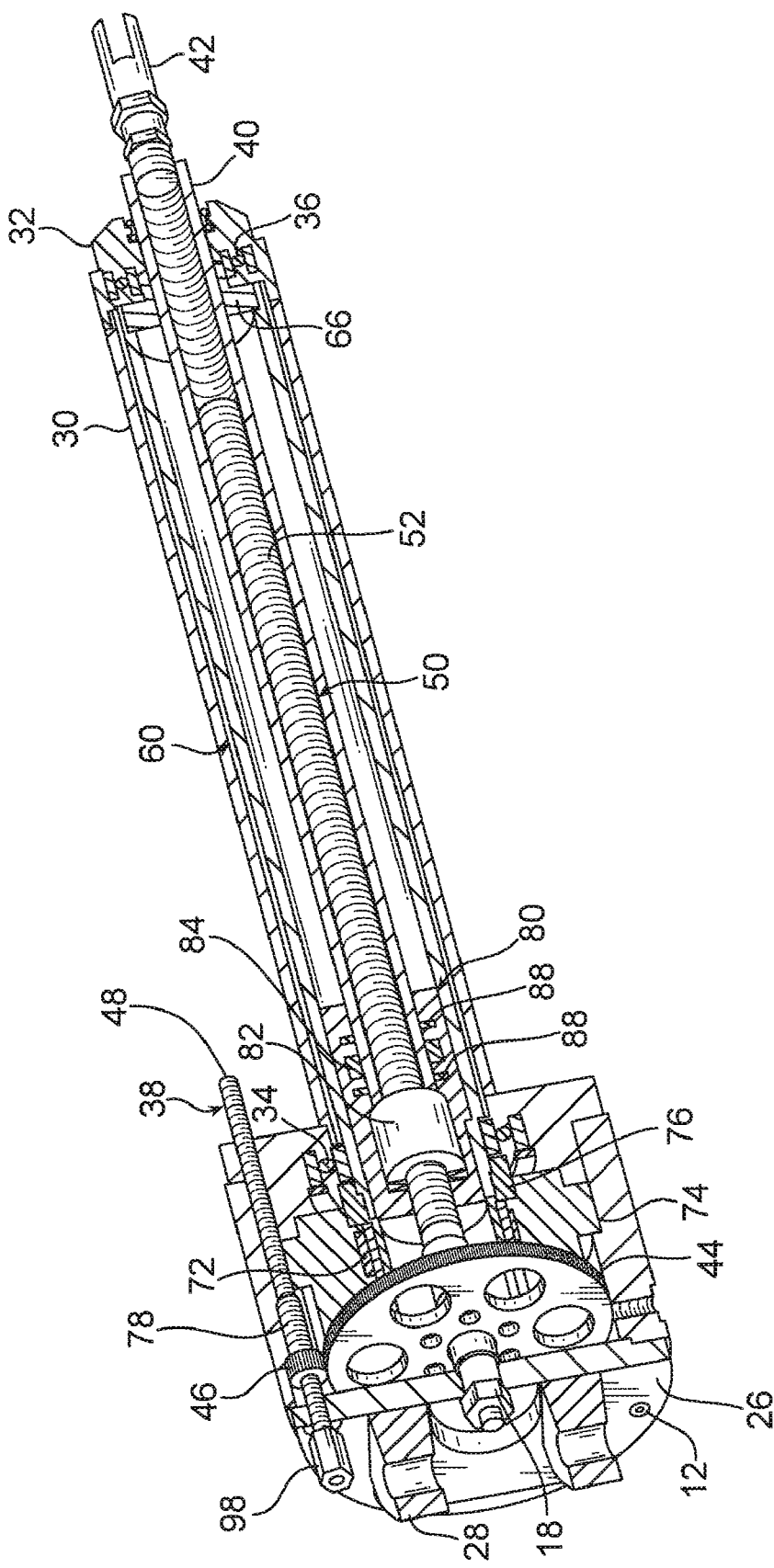
FIG. 5 is a perspective, partial, cross-sectional view of the high force electro-mechanical actuator of FIG. 1 taken along the longitudinal axis of the actuator.

Referring now to FIGS. 3-5, the internal components of the actuator 10 are shown in detail. The actuator 10 further comprises an externally threaded stationary shaft 50, a rotatable tube 60, an electric motor 70, and a driven member 80. The externally threaded shaft 50, also referred to herein as a screw, is attached at one end thereof to the endplate 26 of the motor housing 20 by a fastener 18, such that the externally threaded shaft 50 is stationary. The rotatable tube 60 is concentrically positioned about the stationary screw 50. The rotatable tube 60 is driven at a first end 62 thereof by the motor 70 positioned in the motor housing 20. The rotatable tube 60 is coupled to the driven member 80 referred to in this embodiment as a nut assembly. The nut assembly 80 includes a nut member 82, having internal threads engaging the external threads 52 of stationary screw 50 such that the nut member 82 rotates with the rotatable tube 60 and translates along the axis A of the stationary screw 50. The nut assembly 80 includes a thrust collar 84 which is attached to the actuator rod 40 such that the thrust collar 84 and the actuator rod 40 translate with the nut assembly 80 but do not rotate about the stationary screw 50.

The use of the rotatable tube 60 allows the threaded screw 50 to remain stationary. This in turn eliminates the screw whip, its associated vibration, and also improves the column loading capability of the screw 50 (i.e. stationary versus rotating). The rotatable tube 60 has a larger moment of inertia than the slender screw 50. The larger moment of inertia allows for much higher rotational speeds without experiencing any whip in the tube 60. Accordingly, the tube configuration of the actuator provides a significant improvement over prior art rotating screw actuators.

Figure 10:
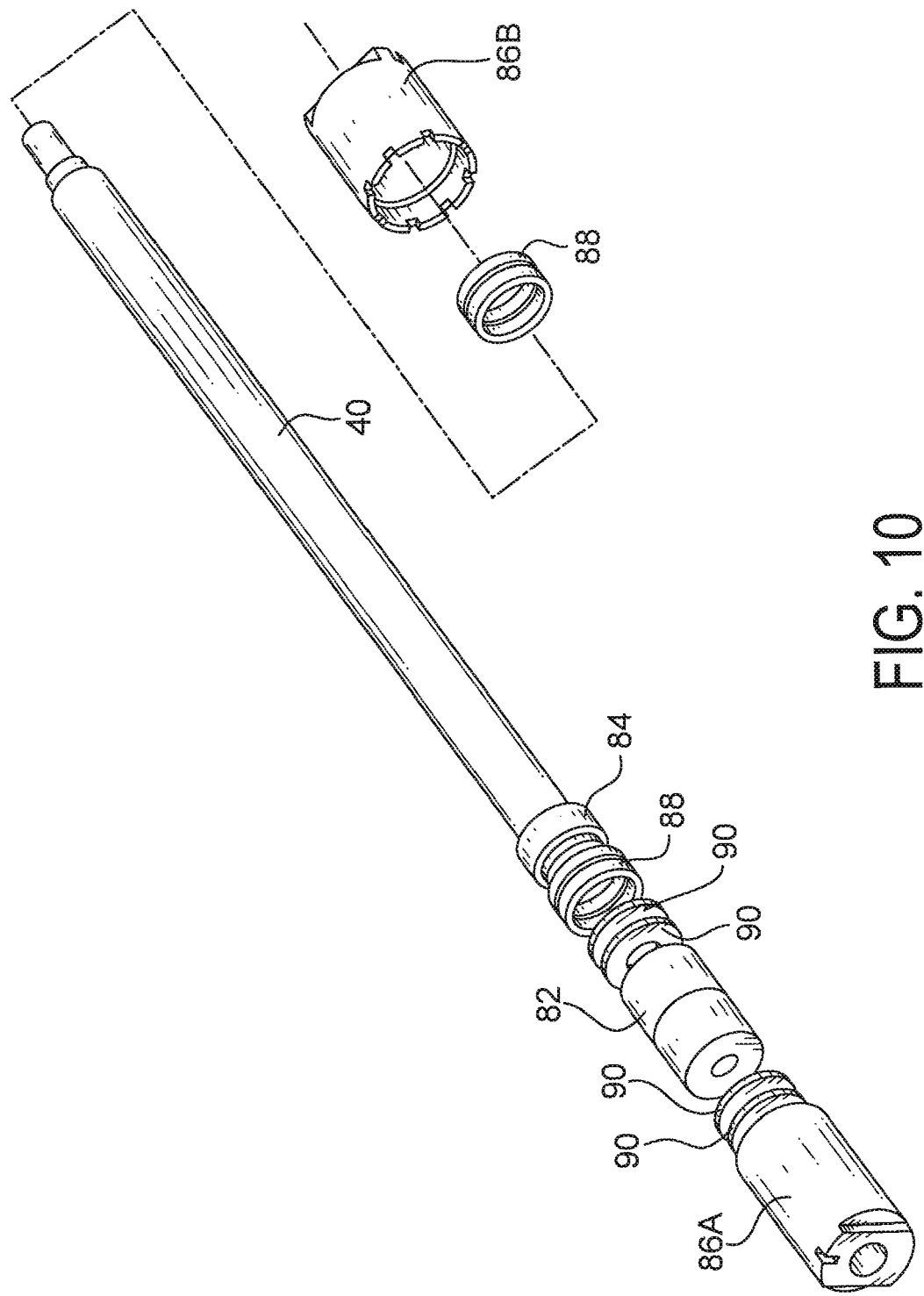
FIG. 10 is a an exploded, perspective view of selected interior components of the high force electro-mechanical actuator.

As shown in detail in FIG. 4 and shown in an exploded view in FIG. 10, the nut assembly 80 comprises a carriage 86 formed by a rear carriage 86A attached to a front carriage 86B. The rear carriage 86A houses the nut member 82 and is coupled to the nut member 82 such that the carriage 86 rotates with the rotatable tube 60 and translates with the nut member 82 along the axis A of the stationary screw 50. The thrust collar 84 is housed in the front carriage 86B which also houses at least one thrust bearing 88 associated with the thrust collar 84. The thrust bearings 88 allow the thrust collar 84 to translate with the nut member 82 along the axis A of the stationary screw 50—without rotating with the nut member 82 and the carriage 86. The nut assembly 80 may also include spring washers 90 or other dampening members positioned in the carriage 86.

Figure 11:
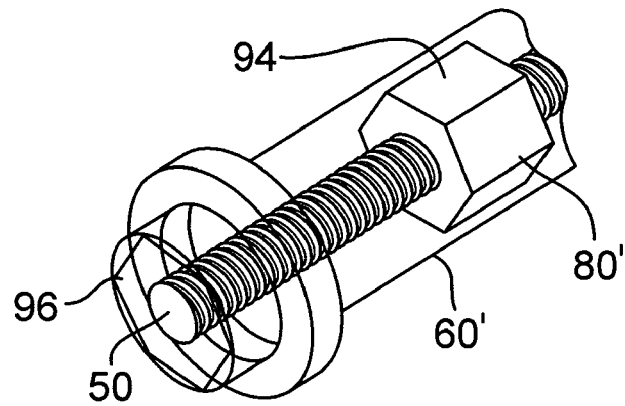
FIG. 11 is an perspective view of another embodiment of the high force electro-mechanical actuator showing an alternate tube and driven member interface.
Figure 12:
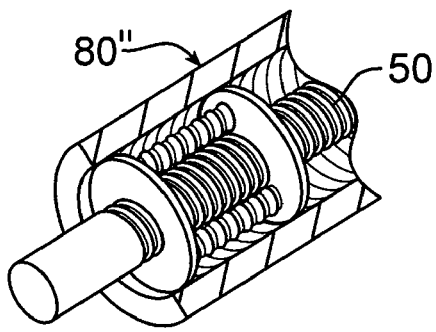
FIG. 12 is a planetary nut assembly.
Figure 13:
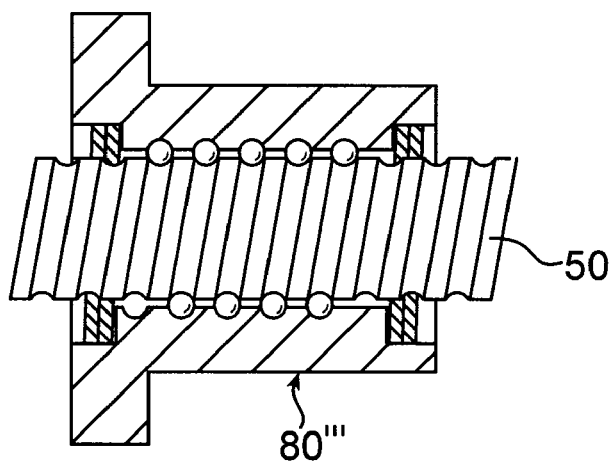
FIG. 13 is a ball screw nut assembly.

The driven member 80 is not intended to be limited to the configuration shown. It is contemplated that the driven member may also be another configuration of a nut having internal threads, for example, a nut assembly 80' as shown in FIG. 11, or a roller nut assembly 80" as shown in FIG. 12, or a ball nut assembly 80'" as shown in FIG. 13.

Referring back to FIGS. 3-5, the motor 70 is shown as an in-line frameless motor providing a direct drive for the actuator 10. The motor 70 comprises a rotor 72 and a stator 74 as is known in the art. The rotor 72 is attached to a drive coupling 76 that is fixably attached to the rotatable tube 60.

It is noted that the motor 70 is not intended to be limited to the configuration shown. It is contemplated that the motor may be any known type of motor such as those utilizing a flexible coupling or that utilize a belt in a parallel or offset motor configuration, as an example.

A first bearing 34 is positioned between the front plate 24 and the first end 62 of the rotatable tube 60. The second end 64 of the rotatable tube 60 has an end bushing 66 fixably attached thereto. The end bushing 66 has a through hole 68 that provides clearance for the actuator rod 40. A second bearing 36 is positioned between the end bushing 66 and the end cover 32 of the cylindrical cover 30. It is noted that additional bearings could be utilized as needed between the cover 30 and the rotatable tube 60 such as for long stroke applications.

The actuator 10 may include a mechanical override system 38. The mechanical override 38 comprises a gear 44 that is fixably attached to the drive coupling 76. The gear 44 rotates with the drive coupling 76 and rotor 72. The override system also includes a second smaller gear 46 affixed on a shaft 48 that is biased by a spring 78 such that the smaller gear 46 does not engage the larger gear 44. In the event of a power loss to the motor 70, an operator can move the actuator rod 40 by pushing a nut 98 attached to an end of the shaft 48 and compressing the spring 78 to move the smaller gear 46 into engagement with the larger gear 44. The nut 98 is then rotated, which through the shaft 48 rotates the smaller gear 46, which rotates the larger gear 44, the drive coupling 76, the rotatable tube 60, the nut assembly 80 and axially moves the actuator rod 40 depending on the rotational direction on the nut 98.

Figure 6:
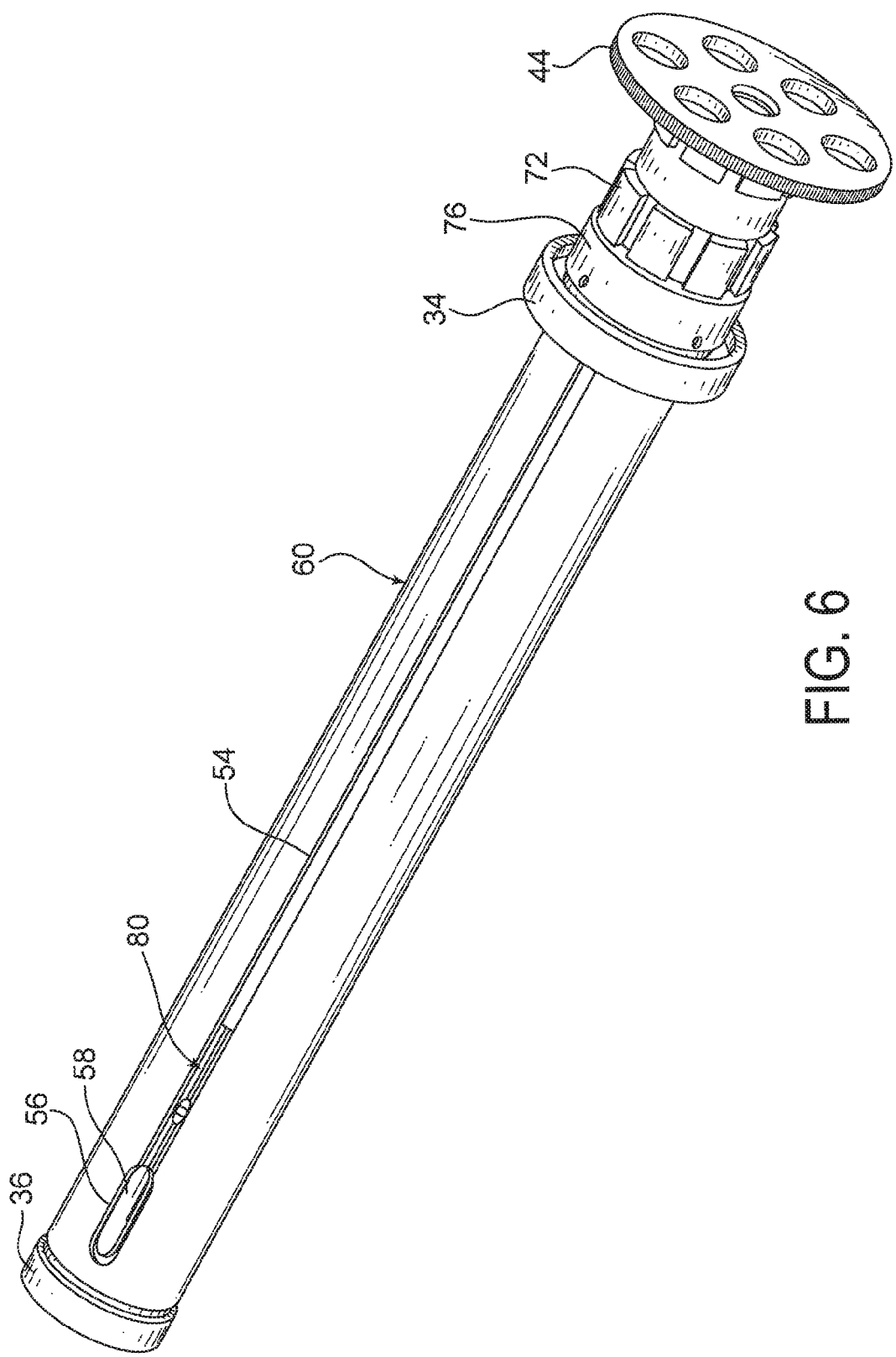
FIG. 6 is a perspective view of the assembled rotating components of the high force electro-mechanical actuator of FIG. 1.
Figure 7:
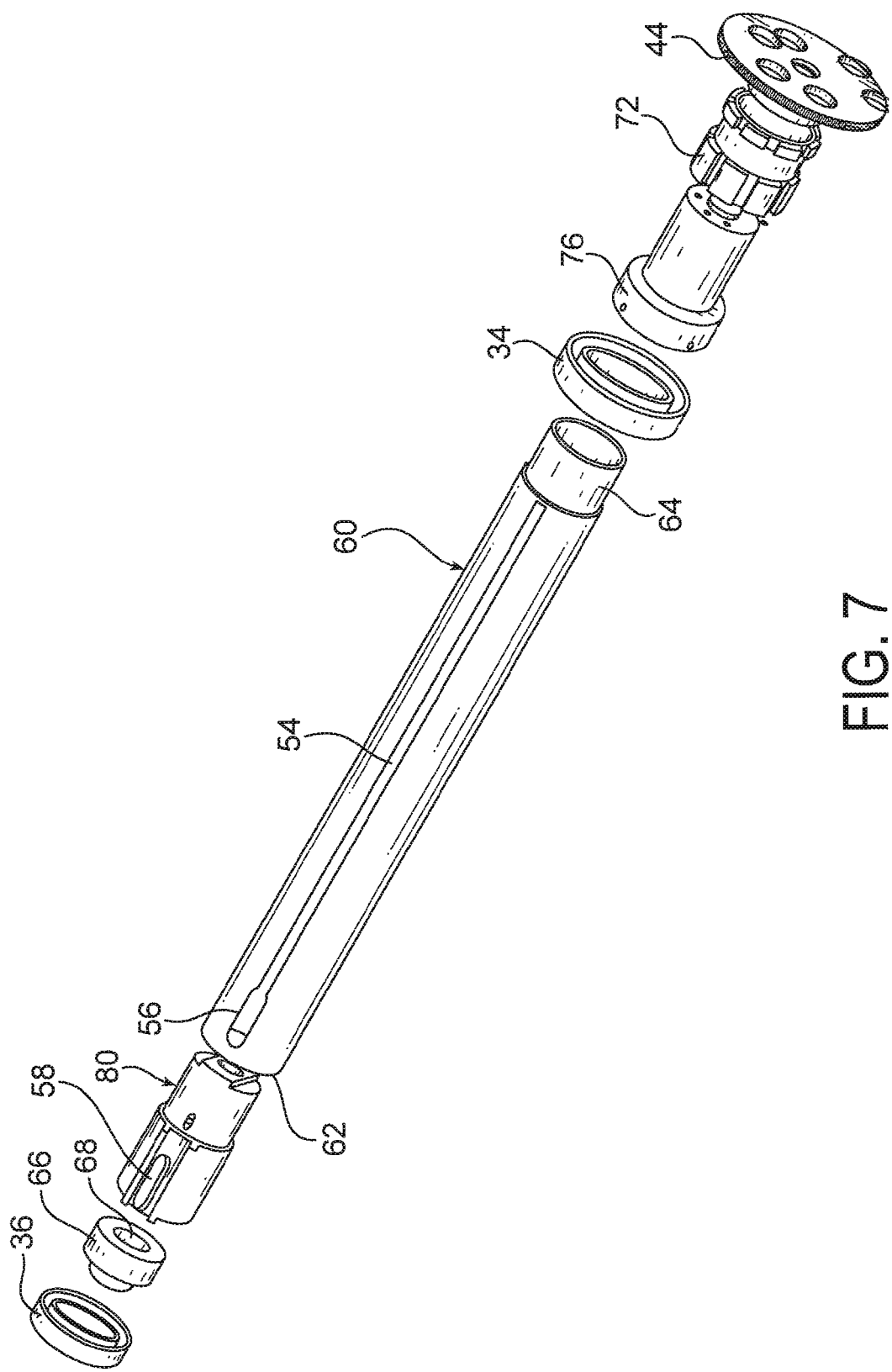
FIG. 7 is an exploded, perspective view of the rotating components of the high force electro-mechanical actuator shown in FIG. 6.

The rotating components of the actuator 10 are shown in FIGS. 6-7 and includes the large gear 44 of the mechanical override 38, the rotor 72, the drive coupling 76, the rotatable tube 60, the nut assembly 80 (which includes non-rotating components), and the end bushing 66. While the bearings 34, 36 are shown it is noted that the outer races of the bearings do not rotate. The rotatable tube 60 is rotationally coupled to the driven member 80 while the driven member 80 moves axially with respect to the rotatable tube 60 during rotation of the rotatable tube 60. In the embodiment shown, a key 58 is used to couple the rotatable tube and the nut assembly 80. The rotatable tube 60 has an axial slot 54 extending almost the length of the tube 60. The slot 54 includes an enlarged slot portion 56 at one end of slot 54 to allow the key 58 to be positioned in a slot in the nut assembly 80 while the nut assembly 80 is in the tube 60. While the key 58 is in the slot 54, the key 58 is captured in engagement with the nut assembly 80 and rotationally couples the tube 60 and the nut assembly 80.

In another embodiment, as shown in FIG. 11, the tube 60' has an interior portion having a cross-section with at least one rotational drive face 96, and as shown is in the form of a hexagon. The outer surface of the driven member 80' has at least one driven face 94 registering against the drive face 96 of the tube 60'. The tube 60' and driven member 80' are thus rotationally coupled, however, the driven member 80' is free to move axially with respect to the tube 60'.

It is noted that the connection between the rotatable tube and the driven member can be accomplished in any number of ways and the examples shown herein are not intended to be limiting of the present invention.

Figure 8:
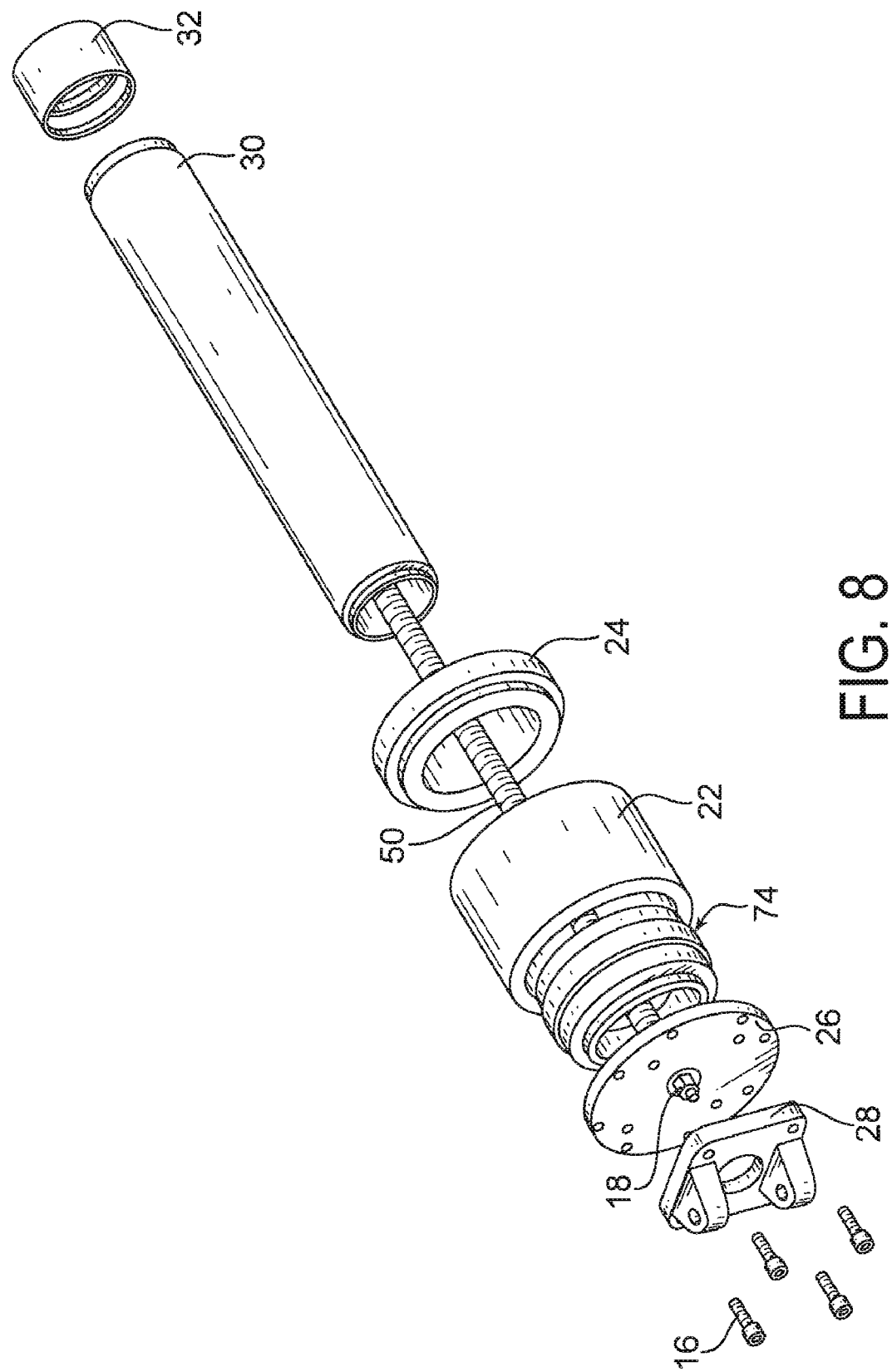
FIG. 8 is an exploded, perspective view of the stationary components of the high force electro-mechanical actuator.

Referring now to FIG. 8, the stationary components of the actuator 10 are shown in an exploded view and include the mounting means 28 and fasteners 16, the end plate 26, the stator 74, the generally cylindrical motor housing 22, the front plate 24 of the motor housing 20, the stationary screw 50 and the associated fasteners 18, the cylindrical cover 30 and the end cover 32.

Figure 9:
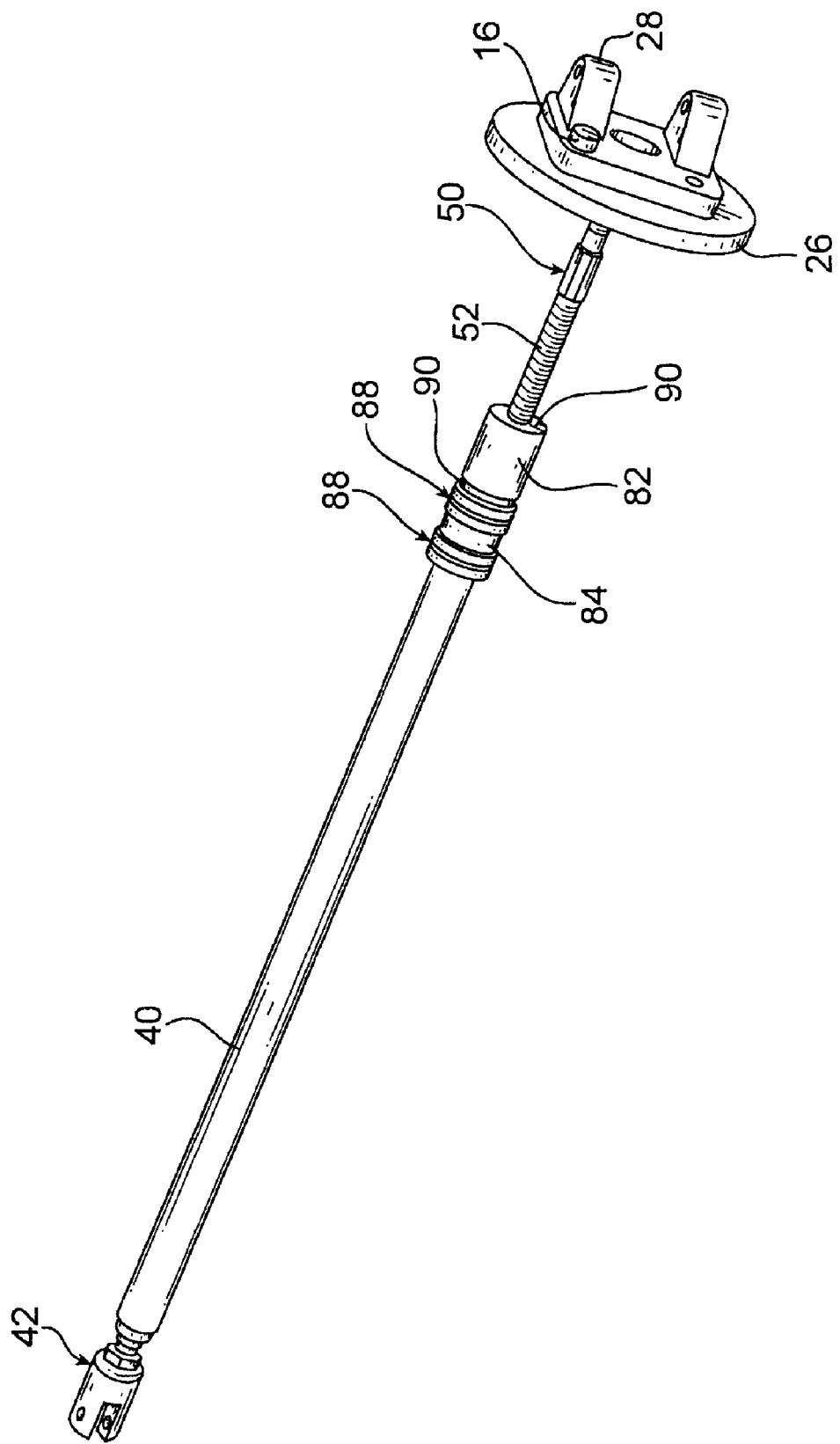
FIG. 9 is a perspective view of the actuator rod and the stationary screw and associated components of the high force electro-mechanical actuator.

FIG. 9 provides another view of selected components of the actuator 10 in an assembled condition. The threaded shaft 50 is shown attached to end plate 26. The interior portions of the nut assembly 80 are shown, specifically the spring washers 90 on either cylindrical end of the nut member 82. Thrust bearings 88 are shown on either side of the thrust collar 84. It is clearer in this view that all loads on the actuator rod 40 are directly transferred through the threaded shaft 50 to the end plate 26 and associated mounting means 28 attached to the end plate 26 which also allows for a much more rigid connection in the rear of the actuator 10. This makes the actuator 10 more robust than prior art systems where the screw is driven by the motor such that the loads on the actuator rod are transferred through the screw to the motor. In contrast, the motor 70 of actuator 10 is not subjected to any thrust load (and no preload is required) as the rotor 72 is coupled to the tube 60 as opposed to the rotating screw as in the prior art.

Another benefit of the actuator 10 is that it provides a long stroke length in comparison to its overall length. This allows the actuator 10 to be used in many smaller places where bulkier prior art electric actuators have been unable to be used. The smaller footprint of the actuator 10 also enables a mounting clevis 28 to be attached to the endplate 26 which is often not possible with prior art electric actuators.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention. Accordingly, the scope and content of the present invention are to be defined only by the terms of the appended claims.

What is claimed is:

1. An actuator comprising:
   a housing;
   an externally threaded shaft fixably supported by the housing;
   a rotatable tube concentric with the threaded shaft;
   a driven member having threads engaging the threaded shaft, and the driven member rotationally coupled to the rotatable tube and axially moveable relative to the rotatable tube, upon rotation of the rotatable tube.

2. The actuator of claim 1, wherein the driven member is a nut having an internal spiral interface complimenting the external threads of the stationary shaft.

3. The actuator of claim 2, wherein the internal interface of the nut is an ACME screw thread, a ball screw configuration, or a planetary roller screw configuration.

4. The actuator of claim 1 further comprising an actuator rod axially coupled to the driven member, wherein the actuator rod does not rotate with the driven member.

5. The actuator of claim 1, wherein the driven member is a nut assembly comprising:
   a nut housing rotatable with the rotatable tube;
   a threaded portion positioned at least partially within the nut housing, the threaded portion engaging the threads of the stationary externally threaded shaft, the threaded portion rotationally coupled to the nut housing; and
   a thrust collar positioned at least partially within the nut housing, the thrust collar separated from the nut housing by at least one thrust bearing such that the thrust collar is axially coupled to the nut housing but does not rotate with the nut housing.

6. The actuator of claim 5 further comprising an actuator rod fixably attached to the thrust collar.

7. The actuator of claim 1 further comprising an electric motor.

8. The actuator of claim 7, wherein the motor drives the rotatable tube.

9. The actuator of claim 1, wherein the rotatable tube includes a slot extending axially along a majority of the length of the rotatable tube.

10. The actuator of claim 9, further comprising a key that engages a slot in the nut and the slot in the rotatable tube, wherein the rotatable tube is rotationally coupled to the nut by the key and the key translates along the slot in the rotatable tube when the rotatable tube rotates.

11. The actuator of claim 1, further comprising a manual override system.

12. The actuator of claim 1, further comprising:
    a stationary tube positioned over the rotatable tube and concentric with the rotatable tube.

13. The actuator of claim 12, further comprising:
    a plurality of support bearings positioned between the stationary tube and the rotatable tube.

14. The actuator of claim 1, further comprising an external mounting support attachable to an endplate of the housing.

15. The actuator of claim 1, wherein at least a portion of the inner surface of the rotatable tube drivingly engages at least a peripheral portion of the driven member to rotationally couple the rotatable tube and the driven member while allowing the driven member to move axially with respect to the rotatable tube.

16. An actuator comprising:
    a fixed screw attached at one end to an actuator housing;
    a rotatable tube concentric with the fixed screw;
    a driven member having threads engaging the threaded shaft, the driven member rotationally coupled to the rotatable tube and axially moveable relative to the rotatable tube, upon rotation of the rotatable tube;
    an actuator rod axially coupled to the driven member, wherein the actuator rod does not rotate with the driven member.

17. The actuator of claim 16, wherein the driven member is a nut having an internal spiral interface complimenting the external threads of the stationary shaft.

18. The actuator of claim 17, wherein the internal interface of the nut is an ACME screw thread, a ball screw configuration, or a planetary roller screw configuration.

19. The actuator of claim 16, wherein the rotatable tube includes a slot extending axially along a majority of the length of the rotatable tube.

20. The actuator of claim 19, further comprising a key that engages a slot in the nut and the slot in the rotatable tube, wherein the rotatable tube is rotationally coupled to the nut by the key and the key translates along the slot in the rotatable tube when the rotatable tube rotates.

21. An actuator comprising:
    an electric motor having a rotor and a stator positioned within a motor housing;
    a stationary, externally threaded shaft fixably attached to the motor housing;
    a rotatable tube concentric with the externally threaded shaft, the rotatable tube rotationally coupled to the rotor and selectively driven by the electric motor;
    a nut having threads engaging the externally threaded shaft,
    the nut rotationally coupled to the rotatable tube and axially moveable relative to the rotatable tube, upon rotation of the rotatable tube;
    an actuator rod axially coupled to the nut, wherein the actuator rod does not rotate with the nut;
    a stationary tube positioned over the rotatable tube and concentric with the rotatable tube; and
    a plurality of support bearings positioned between the stationary tube and the rotatable tube.

* * * * *